United States Patent
Nakauchi et al.

(10) Patent No.: US 6,228,499 B1
(45) Date of Patent: May 8, 2001

(54) MOLDED RESIN ARTICLES HAVING MARPROOF ORGANIC HARD COAT LAYER AND NON FOGGING ORGANIC HARD COAT LAYER, PROCESS FOR THE PRODUCTION OF THE SAME, AND COATING MATERIALS THEREFOR

(75) Inventors: Jun Nakauchi; Osamu Kawai, both of Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 08/981,041

(22) PCT Filed: Jun. 10, 1996

(86) PCT No.: PCT/JP96/01567

§ 371 Date: Dec. 9, 1997

§ 102(e) Date: Dec. 9, 1997

(87) PCT Pub. No.: WO96/41831

PCT Pub. Date: Dec. 27, 1996

(30) Foreign Application Priority Data

Jun. 9, 1995 (JP) .................................. 7-167120
Jun. 12, 1995 (JP) .................................. 7-167833

(51) Int. Cl.⁷ .............................. C08J 7/04; B32B 27/30
(52) U.S. Cl. ........................ 428/412; 428/522; 427/508; 427/515; 2/435; 522/77; 522/83; 522/85; 522/99; 522/182; 264/175; 264/210.1

(58) Field of Search .................................. 522/83, 85, 99, 522/182, 77; 2/435; 428/412, 522, 337; 427/508, 515; 264/175, 210.1

(56) References Cited

U.S. PATENT DOCUMENTS

| 5,214,085 | * | 5/1993 | Patel et al. ........................... 514/102 |
| 5,426,131 | * | 6/1995 | Katsamberis ......................... 522/16 |
| 5,663,264 | * | 9/1997 | Kawau et al. ........................ 526/320 |

OTHER PUBLICATIONS

English Abstract of JPO 06073213, Mar. 1994.*
English Abstract of JPO 3–141944 A, Sep. 1991.*
English Abstract of JPO 2–129235 A, May 1990.*

* cited by examiner

Primary Examiner—Paul Thibodeau
Assistant Examiner—D. Lawrence Tarazano
(74) Attorney, Agent, or Firm—Finnegan, Henderson, Farabow, Garrett, & Dunner, L.L.P.

(57) ABSTRACT

The present invention relates to; resin molded articles having on one side of the resin substrate thereof, such as polycarbonate, a scuff resistant organic hard coat layer and on the other surface of the substrate an antifogging organic hard coat layer; resin shaped articles such as into helmet shields, goggles, and the like, in which the organic hard coat layer will not peel off the substrate when molded into a curve-shaped article having a radius of curvature of 50 mm or less and which will cause no optical distortions; a process for the manufacture thereof; and the covering materials for forming each hard coat layer.

21 Claims, 1 Drawing Sheet

US 6,228,499 B1

MOLDED RESIN ARTICLES HAVING MARPROOF ORGANIC HARD COAT LAYER AND NON FOGGING ORGANIC HARD COAT LAYER, PROCESS FOR THE PRODUCTION OF THE SAME, AND COATING MATERIALS THEREFOR

TECHNICAL FIELD

The present invention relates to a resin molded article having a scuff resistant organic hard coat layer and an antifogging organic hard coat layer.

BACKGROUND TECHNOLOGY

Because they exhibit excellent impact resistance and clarity, resins such as polycarbonate resin, acrylic resin, clear polyolefin resin, polystyrene resin, and the like, are used in highway noise—shield boards, automotive head light lenses, helmet shields, goggles, instrument cover materials, and the like.

However, resin molded articles including polycarbonate resins, which are hydrophobic, are deficient in that when such molded articles are used in a high humidity environment, dew forms on the surface of such molded articles, thereby adversely affecting its clarity.

In addition, resin molded articles are deficient in that because they lack a high surface hardness, such as that of a glass product, the surfaces of said molded articles tend to have scratches, thereby adversely affecting the clarity of the molded article.

Japanese Patent Laid-open Publication No. Sho57-69043, Hei2-16185, etc., have disclosed resin molded articles with an anti-dew formation capability by generating on the surface of a resin molded article a hydrophilic polymer coat layer, but there are disadvantages in that the adhesion between the hydrophilic polymer layer and the surface of the resin molded article is not sufficient and the durability of the anti-dew formation effect is deficient.

Japanese Patent Laid-open Publication No. Hei6-13615 discloses an invention which provides a plastic molded article having an antifogging organic hard coat layer by applying a coating agent, which is obtained by adding 0.05–2% by weight of nonionic or anionic surfactant with a HLB value at 6–11 to a polyalkylene glycol di(meth) acrylate, onto the surface of a plastic molded article and then photoirradiating the coated surface, thereby hardening it. The plastic molded article provided with the antifogging organic coat layer obtained by this method exhibits a significantly better antifogging property compared to the prior art products, but the durability of the antifogging effect when in under a high humidity environment is not yet satisfactory, and in addition, the plastic molded article has an insufficient scuff resistance, so that when such a product is used as an outdoor illumination cover, a highway noise shield wall, an automotive headlight lens, a motorcycle helmet shield, and a pair of goggles, scratches on the surface of such a molded article occur easily, thereby causing a decrease in the light transmittance.

Therefore, it may be possible to fabricate a resin molded article provided with certain degrees of antifogging properties and scuff resistance by means of the prior art, but such products in use are deficient in that the antifogging properties of said resin molded articles rapidly decrease with time to the loss of antifogging properties, and the scuff resistance is insufficient, whereby causing the product to have an increasing amount of scuffing over time.

DISCLOSURE OF THE INVENTION

The present inventors studied with the objective of forming a resin molded article free of the above deficiencies, that is, a resin molded article provided with a lasting scuff resistance and lasting antifogging properties at satisfactory levels and have completed the present invention.

There is provided in the present invention a resin molded article in which its cross sectional structure is novel in that one side of the substrate of the resin molded article is provided with a scuff resistant organic hard coat layer having a haze value of not more than 5%, and the other side of the substrate is provided with an antifogging organic hard coat layer of a specific composition, wherein the invention having a feature in that the adhesion between the substrate and the organic hard coat layer is particularly outstanding whereby no peeling between the substrate and the organic hard coat layer occurs when the article is bent at a radius of curvature of not more than 50 mm.

Incidentally, the haze value (%) in this invention is a numerical value calculated by the method defined in the section on test items for the resin molded articles in the examples given herein below.

Figure 1:
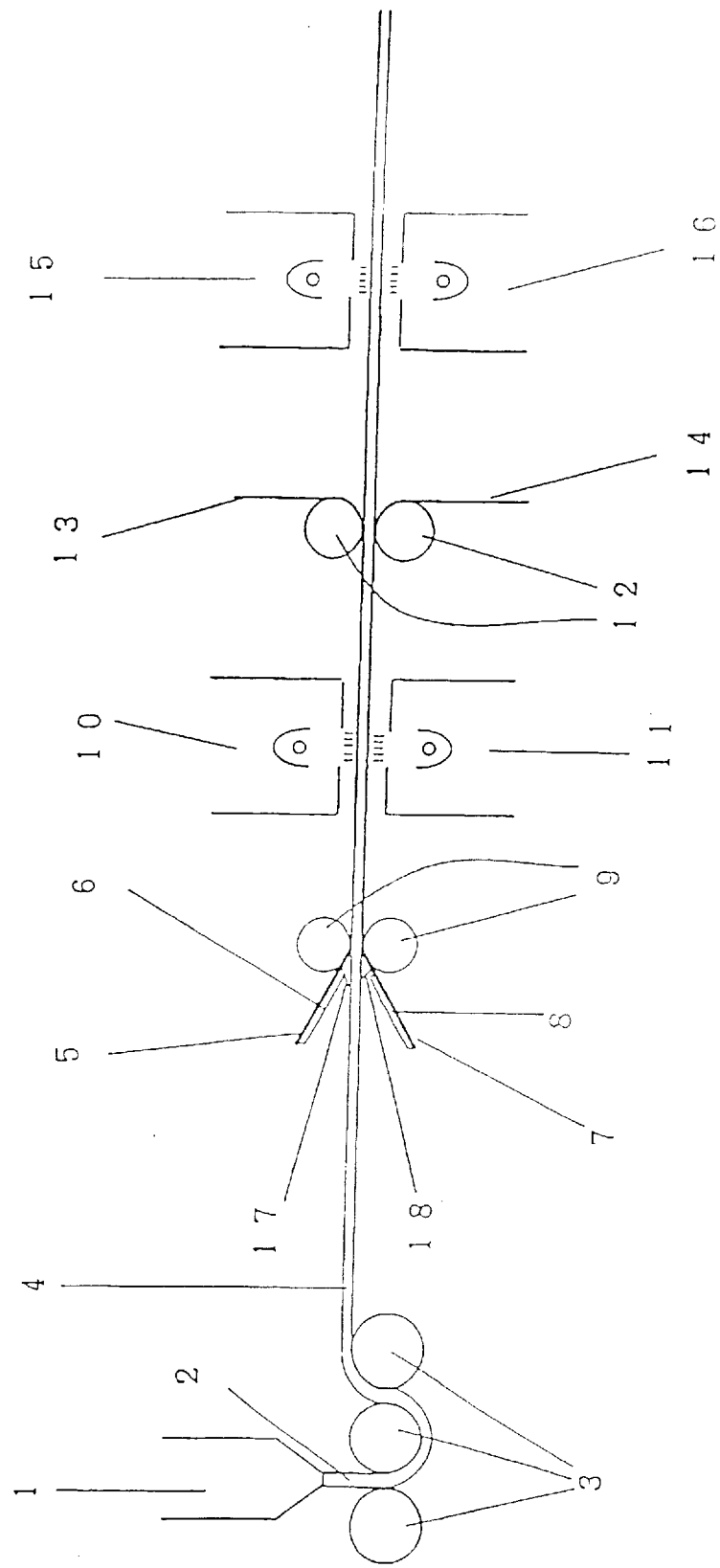
FIG. 1 is an embodiment of a diagram showing continuous manufacturing steps for polycarbonate resin sheets provided with a scuff resistant organic hard coat layer and an antifogging organic hard coat layer.

1: T-die
2: Sheet Extruded from the T-Die
3: 3-Piece Roll
4: Extruded Sheet
5, 7, 13, 14: Release Film
6: Covering Material for Generating a Scuff Resistant Organic Hard Coat layer
8: Covering Material for Generating an Antifogging Organic Hard Coat layer
9, 12: Press Rolls
10, 11: First Light Irradiation Equipment
15, 16: Second Light Irradiation Equipment
17, 18: Resin Reservoirs for Uncured Covering Material

BEST EMBODIMENTS FOR CARRYING OUT THE INVENTION

Resins which constitute the substrates of the resin molded articles of this invention include acrylic resins, polycarbonate resins, polystyrene resins, clear polyolefin resins, and the like, preferably, acrylic or polycarbonate resin of good light transmittance, in particular, a polycarbonate resin of high impact resistance. The substrate thickness is not particularly limited, but in view of bending processability, the sheet thickness is preferably in the range of 0.5–5 mm.

In regard to the shape of the resin molded article substrate, any desired shapes are permitted, such as sheet form products, including extruded sheets and cast sheets, and the like, and illumination covers, automotive head light lenses, motorcycle helmet shields, goggles, and the like, and furthermore molded articles suitable for a variety of applications can be fabricated by punching or thermoforming.

The resin molded article of this invention is characterized in that in spite of its having a scuff resistant hard coat layer, it can be thermoformed into a molded article having a radius of curvature not more than of 50 mm, and the substrate and the scuff resistant organic hard coat layer remain well adhered to each other and do not peel apart.

In the case of motorcycle helmet shield, there are advantages in that the external face of the substrate (that is, the external surface) has a scuff resistant organic hard coat layer and resists scuffing when it is hit by with sandy dust, thereby maintaining clarity, while the internal face (that is, the surface toward the face) of the substrate does not fog due to moisture from the user's perspiration, and the like.

The covering material for forming an antifogging organic hard coat layer used in this invention comprises the following compositions:

100 parts by weight of a crosslink-polymerizable mixture (A) formed by mixing the following (a-1)–(a-3) components to a total of 100 parts by weight; wherein;
(a-1): 10–90 parts by weight of a polyethylene glycol di(meth)acrylate having an average molecular weight of 150–2,000;
(a-2): 0–40 parts by weight of a di(meth)acrylate having the following general formula (1)

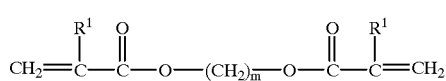
(1)

(where; $R^1$ is H or $CH_3$; m represents an integer of 2–50);
(a-3): 0–90 parts by weight of at least one other copolymerizable (meth)acrylate or poly(meth)acrylate;

0.1–15 parts by weight of a surfactant (B) comprising of at least one type selected from nonionic or anionic surfactants;

0.1–20 parts by weight of a hydrophilic copolymer (C) obtained 5–95 parts by weight of a monomer represented by the general formula (2) below and 95–5 parts by weight of a monomer represented by the general formula (3) below, or 10–150 parts by weight of fine metal oxide particles (D) which have been chemically modified with the following polymerizable silane coupling agent;

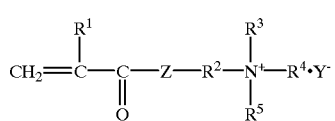
(2)

(where; $R^1$ represents hydrogen or $CH_3$; $R^2$ is a $C_2$–$C_8$ alkylene group; $R^3$–$R^5$ are $C_1$–$C_{50}$ alkyl groups; $R^6$ is H or an alkyl group; Z is an O atom or $NR^6$; $R^6$ is H or an alkyl group; and Y is the anion of the quarternization agent.)

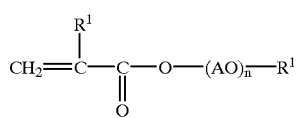
(3)

(where; $R^1$ is the same as the above; A is a $C_2$–$C_{10}$ alkylene group; n is an integer of 1–100); and
0.01–10 parts by weight of a polymerization initiator (E).

Component (a-1)

The polyalkylene glycol di(meth)acrylate having a molecular weight of 150–2,000 used as an (a-1) component is an essential component which generates a durable antifogging organic hard coat layer on a resin molded article of this invention, in particular, the (a-1) component, through a synergistic effect with a hydrophilic copolymer (C) or metal oxide fine particles (D) chemically modified with a silane coupling agent, uniformly and strongly traps a nonpolymerizable surfactant (B) component up to 15% by weight in the antifogging organic hard coat layer, thereby exerting the effect of providing the antifogging hard coat layer with excellent antifogging properties. Thus, this effect becomes substantial when the covering material forming the antifogging organic coat layer (hereafter simply referred to as antifogging covering material) uses in it 10–90 parts by weight, particularly 50–90 parts by weight, of the (a-1) component.

The excellent effect of trapping the surfactant into the antifogging organic hard coat layer will be insufficient with the (a-1) polyalkylene glycol di(meth)acrylate alone as the covering material, and that effect can be made significant by a combined use, as shown in this invention, of a hydrophilic copolymer (C) containing a quaternary ammonium base or a fine metal oxide powder (D) which has been chemically modified with a silane coupling agent containing a polymerizable vinyl group.

Component (a-2)

The alkylene glycol di(meth)acrylate represented by (a-2) is a component that renders excellent film adhesion and scuff resistance to the antifogging organic hard coat layer generated by the antifogging covering material used in this invention.

The number of methylene linkages in the compound of general formula (1) constituting the (a-2) is preferably in the range of 2–50, particularly 4–15. Such compounds are, for example, ethylene glycol di(meth)acrylate, 1,4-butane diol di(meth)acrylate, 1,6-hexane diol di(meth)acrylate, 1,9-nonane diol di(meth)acrylate, and the like.

A covering material capable of generating a highly scuff resistant antifogging organic hard coat layer can be obtained by having the amount of (a-2) component added in the antifogging covering material up to the range of 40 parts by weight, but if metal oxide fine particles (D) chemically modified with a silane coupling agent are used, one can form an antifogging organic hard coat layer having excellent scuff resistance from said covering material even when the (a-2) component is not added to the antifogging covering material.

Component (a-3)

The mono- or poly(meth)acrylates represented by (a-3) may include methyl (meth)acrylate, ethyl (meth)acrylate, 2-ethylhexyl(meth)acrylate, furfuryl (meth)acrylate, glycerine tri(meth)acrylate, pentaerythritol tri(meth)acrylate, pentaerythritol tetra(meth)acrylate, diglycerine tetra(meth)acrylate, dipentaerythritol hexa(meth)acrylate, polyethylene oxide-modified bisphenol A di(meth)acrylate, polyester poly (meth)acrylate, urethane di(meth)acrylates, and the like, and this component may be preferably used at a suitable ratio of not more than 90 parts by weight to improve the viscosity or cure characteristics of the antifogging covering material.

Surfactant (B)

The preferred nonionic surfactant used in this invention is a nonionic surfactant having an HLB value of 6–11, particularly the type represented by the general formula (4)

(4)

(where; $R^{10}$ is an alkyl or alkyl phenyl group; p is an integer of 1–50).

Nonionic surfactants include, for example, polyoxyethylene lauryl ether, polyoxyethylene cetyl ether, polyoxyethylene stearyl ether, polyoxyethylene oleyl ether, polyoxyethylene octyl phenyl ether, polyoxyethylene nonyl phenyl ether, and the like.

Such a nonionic surfactant may be used in an amount of 0.1–15 parts by weight, particularly 0.1–10 parts by weight in the antifogging covering material of this invention.

The anionic surfactant used in carrying out this invention is the type represented by general formula (5), which includes, for example, specifically a completely or partially neutralized mono- or di-ester phosphates of polyoxyethylene derivatives such as polyoxyethylene lauryl ether, polyoxyethylene cetyl ether, polyoxyethylene stearyl ether, polyoxyethylene oleyl ether, polyoxyethylene octyl phenyl ether, polyoxyethylene nonyl phenyl ether, or the like.

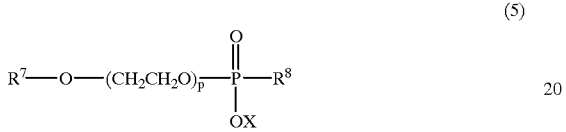

(5)

(where; $R^7$ is an alkyl group or phenyl group; $R^8$ is —OX or —O—$(CH_2CH_2O)_q$—$R^9$ (where $R^9$ is an alkyl or phenyl group; q is an integer of 1–50); X represents an alkali metal or an ammonium group; and p is an integer of 1–50).

The amount of the anionic surfactant to be added to the antifogging covering material may be in the range of 0.1–15 parts by weight, particularly 0.1–5 parts by weight.

In order to form a better antifogging organic hard coat layer from an antifogging covering material of this invention, a combination of 0.1–10 parts by weight of a nonionic surfactant and 0.1–5 parts by weight of an anionic surfactant may be used. The antifogging organic hard coat layer prepared from this covering layer maintains good antifogging properties even when it is subjected to a repeated history of wet heat.

Hydrophilic Copolymer (C)

The hydrophilic copolymer (C) is a copolymer of 5–95 parts by weight of a compound represented by general formula (2) and 95–5 parts by weight of a compound represented by general formula (3), and it includes, for example, a polymer of 5/95-95/5 (by weight of) trimethylaminopropyl methacrylamide methyl sulfate/ polyethyleneglycol monomethacrylate monomethylether with 23 repeating units.

The amount of the hydrophilic copolymer (C) added to the antifogging covering material may be, preferably 0.1–50 parts by weight, particularly 0.2–20 parts by weight. The antifogging hard coat layer formed from an antifogging covering material to which a hydrophilic copolymer (C) is added has an extremely small amount of the surfactant leaching out of said layer, thereby providing the antifogging organic hard coat layer with lasting antifogging properties.

Fine Metal Oxide Particles (D)

Addition at a rate of 0.5–50 parts by weight of (D) fine metal oxide particles used in the embodiments of the present invention hemically modified with a polymerizable silane coupling agent used in carrying out this invention, can further enhance the excellent antifogging effect as well as scuff resistance of the antifogging organic hard coat layer prepared from such covering material.

The silane coupling agent that can be used includes a compound represented by the general formula (6)

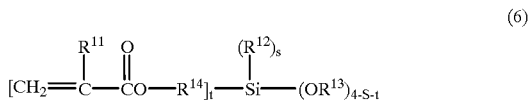

(6)

(where $R^{11}$ is H or $CH_3$; $R^{12}$ and $R^{13}$ represent H or a $C_1$–$C_{10}$ alkyl group; $R^{14}$ is a $C_1$–$C_{10}$ alkylene group; s is an integer of 0–1; and t is an integer of 1–2), or a Michael addition reaction product [I] of a silane containing a primary or secondary amino group with a polyalkylene (including the type containing —O— in the alkylene linkage) glycol poly(meth)acrylate [I] or a Michael addition reaction product [II] of a silane containing a mercapto group with a polyalkylene (including the type containing —O— in the alkylene linkage) glycol poly(meth)acrylate. Polyalkylene glycol polyacrylate is particularly preferable to be polyalkylene glycol diacrylate to have a molecular weight of 150–1,000 from the standpoint of increasing the effect of trapping the surfactant in the antifogging organic hard coat layer.

These silane coupling agents may also be used in combination with an unpolymerizable silane coupling agent.

The silane coupling agent represented by general formula (6) includes, for example, γ-(meth)acryloyloxypropyl trialkoxysilane, di(meth)acrylotloxydialkoxy silane, and the like.

The Michael addition reaction product of a silane containing a primary or secondary amino group with a polyoxyalkylene glycol polyacrylate may be prepared in the following manner:

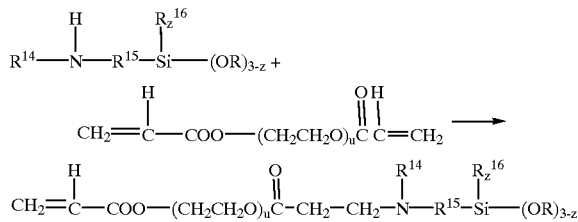

(where; $R^{14}$ is H or $CH_3$; at least one of the $R^{14}$ groups is H; $R^{15}$ is an alkylene group; $R^{16}$ is an alkyl group; u is an integer of 1–10; z is an integer of 0–2).

The Michael addition reaction product [II] of a silane containing a mercapto group with a polyalkylene glycol poly(meth)acrylate may be, for example, prepared in the following manner:

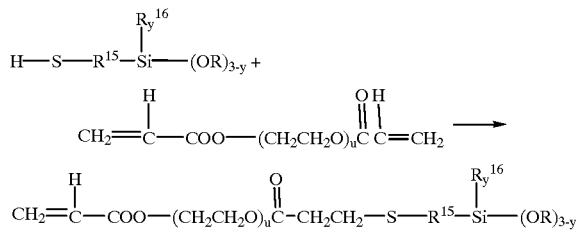

(where; $R^{15}$, $R^{16}$, and u are the same as above; y represents an integer of 0–2).

The amino silane compounds include, for example, the following:

N-(2-aminoethyl-3-aminopropyl)trimethoxy silane
3-aminopropyl triethoxysilane
3-aminopropyl trimethoxy silane The mercaptosilanes may include, as an example, the following compounds:

γ-mercaptopropyl trimethoxysilane, α-mercaptopropyl triethoxysilane,
γ-mercaptopropylmethyl dimethoxysilane,
γ-mercaptopropylethyl dimethoxysilane,
γ-mercaptopropylbutyl dimethoxy-silane,
γ-mercaptobutylmethyl dimethoxysilane,
γ-mercaptobutyltrimethoxy silane,
γ-mercapto-2-hydroxypropyl trimethoxysilane,
γ-mercapto-2-hydroxy propyl triethoxysilane, and
γ-mercaptopropyl triaminosilane.

The fine metal oxide particles which are chemically modified by these silane coupling agents include, for example, fine titanium oxide particles, fine silicon oxide particles, fine alumina particles, and the like, having a particle size of 1 nm–1 µm, preferably 5–20 nm, in particular, colloidal silica, aerosil, and the like, preferably colloidal silica.

The dispersion media for colloidal silica include water, methanol, ethanol, isopropanol, butanol, cellosolve, dimethylacetazide, toluene, xylene, and the like.

The words, "chemically modified with a silane coupling agent," mean a condition where hydrolysis products of the polymerizable silane coupling agent or its condensation products are fixed on a part or all of the surface of a metal oxide fine particle, thereby the surface characteristics of the fine metal oxide particle being improved.

Polymerization Initiator (E)

The polymerization initiator (E) which is included in the covering material may be any known polymerization initiator, preferably, in particular, a photopolymerization initiator, such as benzophenone, Michler's ketone, benzoin butyl ether, benzoin, benzoin isopropyl ether, methyl benzoyl formate, 2-hydroxy-2-methyl-1-phenyl propane-1-one, 1-(4-isopropylphenyl)2-hydroxy-2-methyl propane-1-one, 2,4,6-trimethyl benzoyl diphenyl phosphine oxide, benzoyl diethoxy phosphine oxide, and the like.

The amount of the polymerization initiator (E) used should be in the range of 0.01–10 parts by weight per 100 parts by weight of a mixture of (a-1)–(a-3).

The covering material used in this invention, by having the above make-up, can give highly durable antifogging properties and scuff resistance when coated onto the surface of a resin molded article, followed by curing. Furthermore, if the substrate of the resin molded article is a sheet, the antifogging organic hard coat layer, even when thermoformed at a radius of curvature of not more than 50 mm, remains well adhered to the resin sheet without being peeled apart.

Covering Material for Generating a Scuff Resistant Organic Hard Coat layer

The following explains the covering material capable of generating a scuff resistant organic hard coat layer having a haze value of not more than 5% after a steel wool test, and being provided on the other surface of the substrate of the resin molded article of this invention.

The present invention calls for the haze value to be not more than 5%, preferably not more than 3.5%, more particularly not more than 1.5%. A haze value exceeding 5% is not preferable because, when the article is used outdoors, it will be scuffed by dust and thereby losing clarity.

The crosslink-polymerizable compound [I] that constitutes the covering material for forming the scuff resistant organic hard coat layer (hereinafter referred to as "scuff resistant coating material") used in carrying out this invention includes, for example, an ester compound obtained from a polyhydric alcohol and (meth)acrylic acid or a derivative thereof or an ester compound derived from a polyhydric alcohol, a polybasic carboxylic acid, and (meth)acrylic acid or a derivative there of.

The polyhydric alcohols include, for example, dihydric alcohols, such as ethylene glycol, diethylene glycol, triethylene glycol, tetraethylene glycol, a polyethylene glycol having an average molecular weight of about 300–about 1,000, propylene glycol, dipropylene glycol, 1,3-propane diol, 1,3-butane diol, 2,3-butane diol, 1,4-butane diol, 1,5-pentane diol, 1,6-hexane diol, 1,9-nonane diol, neopentyl glycol (that is, 2,2-dimethyl-1,3-propane diol), 2-ethylhexyl-1,3-hexane diol, 2,2'-thiodiethanol, 1,4-cyclohexane dimethanol, and the like; trihydric alcohols, such as trimethylolpropane (that is, 1,1,1-trimethylolpropane), pentaglycerol (that is, 1,1,1-trimethylolethane), glycerol, 1,2,4-butane triol, 1,2,6-hexane triol, and the like; and others, such as pentaerythritol (that is, 2,2-bis(hydroxymethyl)-1,3-propane diol), diglycerol, dipentaerythritol, and the like.

The crosslink-polymerizable compound [I] obtained as a poly(meth)acrylate of a polyhydric alcohol includes, for example, the compound represented by the following general formula (7):

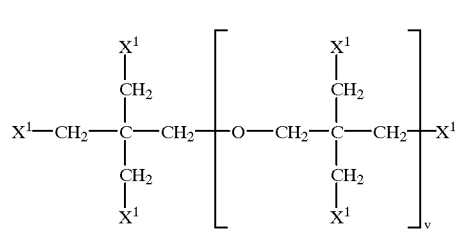

(where; v represents an integer of 0–4; not less than 2 of $X^1$ present in the molecule in not less than 4 represent in the molecule such that two or more represent (meth) acryloyloxy groups; and the remaining $X^1$ independently and respectively represents hydrogen atom, hydroxyl, amino, alkyl, or substituted alkyl groups.

Compounds represented by this general formula (7) include, for example, trimethylolpropane tri(meth)acrylate, trimethylolethane tri(meth)acrylate, pentaglycerol tri(meth) acrylate, pentaerythritol tri(meth)acrylate, pentaerythritol tetra(meth)acrylate, dipentaerythritol (meth)acrylate, dipentaerythritol tetra(meth)acrylate, and the like.

The poly(meth)acrylates of polyhydric alcohols other than those compounds of the above general formula include, for example, diethylene glycol (meth)acrylate, triethylene glycol di(meth)acrylate, tetraethylene glycol di(meth) acrylate, 1,4-butane diol di(meth)acrylate, 1,6-hexane diol di(meth)acrylate, 1,9-nonane diol di(meth)acrylate, and the like.

If the crosslink-polymerizable compound [I] is an ester compound from a polyhydric alcohol and (meth)acrylic acid or its derivative, particularly preferred ester compounds are diethylene glycol di(meth)acrylate, triethylene glycol di(meth)acrylate, tetraethylene glycol di(meth)acrylate, 1,4-butane diol di(meth)acrylate, 1,6-hexane diol di(meth)

acrylate, 1,9-nonane diol di(meth)acrylate, trimethylolpropane tri(meth)acrylate, pentaglycerol acrylate, and dipentaglycerol penta-acrylate.

The ester compound which can be used as the crosslink-polymerizable compound [I] and which may be obtained from a polyhydric alcohol, polycarboxylic acid, and (meth) acrylate acid or their derivatives may be basically obtained by reacting a mixture in which the hydroxyl group of the polyhydric alcohol is ultimately equivalent in quantity to the carboxyl groups of the polycarboxylic acid and (meth) acrylic acid or its derivative.

Preferred from among these ester compounds are esters obtained from a polyhydric alcohol, which is a dihydric alcohol or a trihydric alcohol or a mixture of a dihydric alcohol and trihydric alcohol, along with a dibasic carboxylic acid used as the polybasic carboxylic acid component.

If a mixture of a trihydric alcohol and a dihydric alcohol is used, the molar ratio of the trihydric alcohol and dihydric alcohol can be freely selected.

The molar ratio in the combination of a dibasic carboxylic acid and (meth)acrylic acid or its derivative may be preferably within the range of not more than 2 moles of the carboxylic acid groups of the dibasic carboxylic acid per 1 mole of the carboxylic acid group of the (meth)acrylic acid or its derivative.

If the dibasic carboxylic acid is in excess of the above range, the resultant ester will sometimes be too viscous, making it difficult to form a coated film.

The dibasic carboxylic acids or their derivatives which are used in the synthesis of the above ester compounds include, for example, aliphatic dicarboxylic acids, such as succinic acid, adipic acid, sebacic acid, and the like; alicyclic dicarboxylic acids, such as tetrahydrophthalic acid, 3,6-endomethylene tetrahydrophthalic acid, and the like; aromatic dicarboxylic acids, such as phthalic acid, isophthalic acid, terephthalic acid, and the like; and others, such as thioglycols, thiodivaleric acid, diglycolic acid, maleic acid, fumaric acid, itaconic acid, and their chlorides, anhydrides, and esters.

The above ester compounds used as the crosslink-polymerizable compounds [I] are specifically, for example, saturated or unsaturated polyester poly(meth)acrylates prepared from combinations, such as
malonic acid/trimethylolethane/(meth)acrylic acid;
malonic acid/trimethylolpropane/(meth)acrylic acid;
malonic acid/glycerine/(meth)acrylic acid;
malonic acid/pentaerythritol/(meth)acrylic acid;
succinic acid/trimethylolethane/(meth)acrylic acid;
succinic acid/trimethylolpropane/(meth)acrylic acid;
succinic acid/glycerine/(meth)acrylic acid;
succinic acid/pentaerythritol/(meth)acrylic acid;
adipic acid/trimethylolethane/(meth)acrylic acid;
adipic acid/trimethylolpropane/(meth)'acrylic acid;
adipic acid/pentaerythritol/(meth)acrylic acid;
adipic acid/glyc erine/(meth) acrylic acid;
glutaric acid/trimethylolethane/(moth)acrylic acid;
glutaric acid/trimethylolpropane/(meth)acrylic acid;
glutaric acid/glycerine/(meth)acrylic acid;
glutaric acid/pentaerythritol/(meth)acrylic acid;
sebacic acid/trimethylolethane/(meth)acrylic acid;
sebacic acid/trimethylolpropane/(meth)acrylic acid;
sebacic acid/glycerine/(meth)acrylic acid;
sebacic acid/pentaerythritol/(meth)acrylic acid;
fumaric acid/trimethylolethane/(meth)acrylic acid;
fumaric acid/trimethylolpropane/(meth)acrylic acid;
fumaric acid/glycerine/(meth)acrylic acid;
fumaric acid/pentaerythritol/(meth)acrylic acid;
itaconic acid/trimethylolethane/(meth)acrylic acid;
itaconic acid/trimethylolpropane/(meth)acrylic acid;
itaconic acid/pentaerythritol/(meth)acrylic acid;
maleic anhydride/trimethylolethane/(meth)acrylic acid; or
maleic anhydride/glycerine/(meth)acrylic acid.

Furthermore, the crosslink—polymerizable compound [I] includes urethane (meth)acrylates obtained by reacting by the usual methods a polyisocyanate obtained by trimerization, such as an isocyanate represented by the general formula (8)

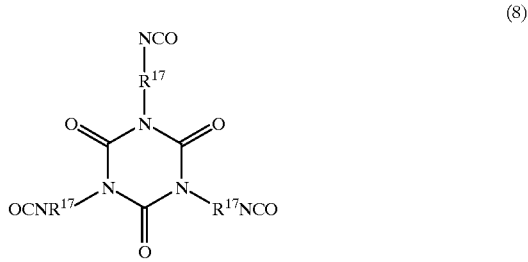

(8)

(where; $R^{17}$ represents an aliphatic alkylene group with the number of carbons being 1–12), hexamethylene diisocyanate, tolylene diisocyanate, diphenyl ethane diisocyanate, xylylene diisocyanate, 4,4'-methylene bis (cyclohexyl isocyanate), isophorone diisocyanate, trimethyl hexamethylene diisocyanate, and the like with an acrylic monomer having active hydrogen, for example, 2-hydroxyethyl (meth)acrylate, 2-hydroxy-3-methoxypropyl(meth)acrylate, N-methylol (meth) acrylamide, N-hydroxy(meth)acryl amide, 3-acryloyloxy-2-hydroxypropyl (meth)acrylate, and the like, at the rate of not less than one mole of the acrylic monomer per one mole of the isocyanate group; and a poly[(meth)acroyloyloxyethyl]isocyanurate, such as a tri(meth)acrylate of tris(2-hydroxyethyl) isocyanuric acid.

The covering material used in this invention, if it uses a mixture comprising not less than 50% by weight of the crosslink-polymerizable compound [I] with not more than 50% by weight of a compound [II] copolymerizable therewith, is capable of bringing the haze value to 50% or less, preferably 3% or less, more particularly 1.5% or less.

The copolymerizable compound [II] includes, for example, a compound having a (meth)acryloyl group in the molecule, and the like. It includes specifically, for examples, methyl (meth)acrylate, ethyl (meth)acrylate, butyl (meth) acrylate, isobutyl (meth)acrylate, t-butyl (meth)acrylate, 2-ethylhexyl (meth)acrylate, lauryl (meth)acrylate, dodecyl (meth)acrylate, cyclohexyl (meth)acrylate, 2-hydroxyethyl (meth)acrylate, 2-hydroxypropyl (meth)acrylate, glycidyl (meth)acrylate, tetrahydrofurfuryl (meth)acrylate, benzyl (meth)acrylate, isobornyl (meth)acrylate, 1-adamantyl (meth)acrylate, 3,5-dimethyl-1-adamantyl (meth)acrylate, dicyclopentanyl (meth)acrylate, dicyclopentenyl (meth) acrylate, 1,4-butylene glycol mono(meth)acrylate, ethoxy-toxyethyl (meth)acrylate, ethyl carbitol (meth)acrylate, 2-hydroxy-3-chloropropyl (meth)acrylate, (meth) acrylamide, N-hydroxyethyl (meth)acrylamide, N-hydroxymethyl (meth)acrylamide, N-hydroxypropyl (meth)acrylamide, 2,2,2-trifluoroethyl (meth)acrylate, 2,2,3, 3-tetrafluoropropyl (meth)acrylate, 1H,1H,5H-octafluoropentyl (meth)acrylate, N-hydroxybutyl (meth) acrylamide, hydroxymethyl diacetone (meth)acrylamide, and N-hydroxyethyle-N-methyl (meth)acrylamide.

Mono(meth)acrylates represented by the following general formulae (9) or (10) are also included:

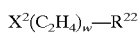
(9)

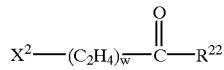
(10)

(where; w is 1–10; $X^2$ represents a (meth)acryloyloxy group; $R^{22}$ represents an alkyl, substituted alkyl, phenyl, substituted phenyl, benzyl, or substituted benzyl group.)

The mono(meth)acrylate represented by the general formulae (9) or (10) includes, for example, methoxy diethylene glycol (meth)acrylate, methoxy polyethylene glycol (meth)acrylate, phenoxy polyethylene glycol (meth)acrylate, and butoxyethylene glycol (meth)acrylate.

The copolymerizable compound [II] includes, for example,
α-(meth)acryloyloxyethyl hydrogen phthalate,
α-(meth)acryloyloxyethyl hydrogen succinate,
α-(meth)acryloyloxy propyl hydrogen succinate,
and various known epoxy (meth)acrylates and urethane (meth)acrylates.

Compound [II] is selected according to the application of the hardened coat film, and if a high surface hardness coated film is desired, use is made of monomer as a compound [II], which is capable of generating a homopolymer having a high glass transition temperature prepared from such monomer.

Specific compounds include, for example, t-butyl (meth)acrylate, cyclohexyl (meth)acrylate, isobornyl (meth)acrylate, 1-adamantyl (meth)acrylate, 3,5-dimethyl-1-adamantyl (meth)acrylate, dicyclopentanyl (meth)acrylate, dicyclopentenyl (meth)acrylate, and the like.

When these compounds [II] are used, they must be incorporated at a rate of not more than 50% by weight in the covering material, where a level not more than 30% by weight can provide a covering material capable of generating a scuff resistant organic hard coat layer with a haze value not more than 5%, preferably not more than 3%, more particularly not more than 1.5%.

The particularly preferred covering material which is used for a resin sheet provided with the scuff resistant organic hard coat layer and antifogging organic hard coat layer of this invention and having an optimum capability to generate a sheet which can be bent to a radius of curvature of not less than 50 mm, may use a photocurable composition comprising; 100 parts by weight of a crosslinkable monomer mixture [I], the mixture comprising, (b-1) 1–99% by weight of a poly functional acrylate obtained by condensing a dibasic carboxylic acid/polyhydric alcohol/(meth)acrylic acid and (b-2) 1–99% by weight of a polyfunctional (meth)acrylate obtained by reacting an isocyanate represented by general formula (8) with an active hydrogen-containing (meth)acrylate, (b-3) 20–80 parts by weight of a mixture [III] comprising 0–20 parts by weight of a urethane (meth)acrylate represented by general formula (11), and [IV] 20–80 parts by weight of a monomer having one to two (meth)acryloyl groups, having a viscosity at 25° C. of not more than 150 cp; 0.1–10 parts by weight of a photoinitiator 2;and 0–6 parts of a ultraviolet absorber [3], and 0–4 parts by weight of hindered amine type light stabilizer [4]. The resin molded article of this invention having the scuff resistant organic hard coat layer obtained by curing this composition, particularly a sheet, preferably a polycarbonate sheet, has the advantage that it can be bent with no problem to a radius of curvature of 50 mm or less, thereby providing a highly processable sheet.

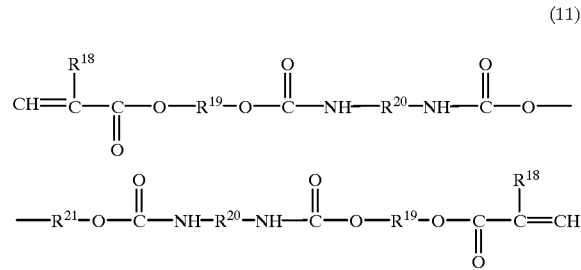
(11)

(where; $R^{18}$ is hydrogen or methyl; $R^{19}$ is a hydrocarbyl group having 1–8 carbons; $R^{20}$ is a phenylene group, substituted phenylene, or an alkylene group having 2–12 carbons; $R^{21}$ is a polycaprolactone diol or

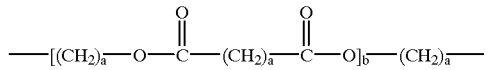

(where; a is an integer of 1–8 and b is an integer of 0–10).

The mixed condensate (b-1) is a saturated or unsaturated polyester poly(meth)acrylate that is obtained by allowing the mixture to react in which the hydroxyl groups of the dihydric alcohol and the carboxyl groups of both the polybasic carboxylic acid and the (meth)acrylic acid are ultimately equivalent in quantity; particularly preferred combinations in this invention obtained, from among those, include condensation products from combinations, such as
malonic acid/trimethylolethane/(meth)acrylic acid,
malonic acid/trimethylolpropane/(meth)acrylic acid,
malonic acid/glycerine/(meth)acrylic acid,
malonic acid/pentaerythritol/(meth)acrylic acid,
succinic acid/trimethylolethane/(meth)acrylic acid,
succinic acid/trimethylolpropane/(meth)acrylic acid,
succinic acid/glycerine/(meth)acrylic acid,
succinic acid/pentaerythritol/(meth)acrylic acid,
adipic acid/trimethylolethane/(meth)acrylic acid,
adipic acid/trimethylolrthane/(meth)acrylic acid,
adipic acid/trimethylolpropane/(meth)acrylic acid,
adipic acid/glycerine/(meth)acrylic acid,
adipic acid/pentaerythritol/(meth)acrylic acid,
glutaric acid/trimethylolethane/(meth)acrylic acid,
glutaric acid/trimethylolpropane/(meth)acrylic acid,
glutaric acid/glycerine/(meth)acrylic acid,
glutaric acid/pentaerythritol/(meth)acrylic acid,
sebacic acid/trimethylolethane/(meth)acrylic acid,
sebacic acid/trimethylolpropane/(meth)acrylic acid,
sebacic acid/glycerine/(meth)acrylic acid,
sebacic acid/pentaerythritol/(meth)acrylic acid,
fumaric acid/trimethylolethane/(meth)acrylic acid,
fumaric acid/trimethylolpropane/(meth)acrylic acid,
fumaric acid/glycerine/(meth)acrylic acid,
fumaric acid/pentaerythritol/(meth)acrylic acid,
itaconic acid/trimethylolethane/(meth)acrylic acid,
itaconic acid/trimethylolpropane/(meth)acrylic acid,
itaconic acid/glycerine/(meth)acrylic acid,
itaconic acid/pentaerythritol/(meth)acrylic acid,
maleic anhydride/trimethylolethane/(meth)acrylic acid,
maleic anhydride/trimethylolpropane/(meth)acrylic acid,
maleic anhydride/glycerine/(meth)acrylic acid, maleic anhydride/pentaerythritol/(meth)acrylic acid, and the like.

Preferred examples of polyfunctional (meth)acrylates (b-2) include urethane (meth)acrylates, and the like, obtained by treating by the usual methods an isocyanate represented by the general formula (8) obtained by trimerizing trimethylolpropane tolylene diisocyanate or hexamethylene diisocyanate, tolylene diiusocyanate, diphenyl methane diisocyanate, xylylene diisocyanate, 4,4'-methylene bis (cyclohexyl isocyanate), isophorone diisocyanate, trimethyl hexamethylene diisocyanate, and the like, with a (meth)acryl monomer having active hydrogen, such as 2-hydroxyethyl (meth)acrylate, 2-hydroxypropyl (meth)acrylate, 2-hydroxy-3-methoxypropyl (meth)acrylate, 2-hydroxy-3-acryloyloxypropyl (meth)acrylate, N-methylol (meth) acrylamide, N-hydroxy (meth)acrylamide, 1,2,3-propane triol-1,3-dimethacrylate, 3-acryloyloxy-2-hydroxypropyl methacrylate, and the like, at a rate of 3 or more moles per mole of the isocyanate.

The preferred example of urethane (meth)acrylates (b-3) represented by the general formula (11) used in this invention includes combinations of dibasic acids, such as succinic acid, adipic acid, sebacic acid, and the like, dihydric alcohols, such as ethylene glycol, 1,4-butane diol, 1,6-hexane diol, and the like, and difunctional isocyanates, such as hexamethylene diisocyanate, phenylene diisocyanate, 5-methyl phenylene-1,3-diisocyanate, as well as combinations of polycaprolactone diol with the above difunctional isocyanates.

Preferred examples for the monomer IV having 1–2 (meth)acrylate groups and having a viscosity at 25° C. of less than 150 cp include methyl (meth)acrylate, ethyl (meth) acrylate, butyl (meth)acrylate, benzyl(meth)acrylate, phenyl (meth)acrylate, cyclohexyl (meth)acrylate, isobornyl (meth) acrylate, 2-ethylhexyl (meth)acrylate, tetrahydrofurfuryl (meth)acrylate, 1,4-butane diol di(meth)acrylate, 1,6-hexane diol di(meth)acrylate, 1,9-nonane diol di(meth)acrylate, polyethylene glycol di(meth)acrylate, and the like. In particular, in terms of a balance between adhesion of the coated film to the substrate and scuff resistance, use of 1,6-hexane diol diacrylate or 1,9-nonane diol acrylate is particularly preferred.

The amounts of monomers (b-1) and (b-2) in this invention is preferably such that the total of (b-1) and (b-2) is 20–80 parts by weight per 100 parts by weight of the monomer mixture [I]; the range of 20–80 parts by weight in the covering material can provide a resin sheet of this invention, particularly a polycarbonate sheet of this invention, having the scuff resistant organic hard coat layer with sufficient scuff resistance and excellent thermoforming processability.

The amount of the monomer (b-1) used in this invention should preferably be 20–80% by weight of the 100 parts by weight of the polyfunctional (meth)acrylate monomer (III); the resin sheet, particularly polycarbonate of this invention, having the scuff resistant organic hard coat layer formed from this covering material shows excellent scuff resistance and is also provided with good thermal forming processability.

The present invention permits the concurrent use of monomer (IV) in combinations to provide the organic hard coat layer with flexibility and with improved thermoformabilty, but the amount is preferably up to 20% by weight per 100 parts by weight of the monomer mixture [I].

Referring to FIG. 1, an explanation is provided for an example of the continuous manufacturing process of a polycarbonate resin sheet, which is a preferred application example of a resin molded article having an antifogging property of the present invention and scuff resistance at a haze value of not more than 5%.

In FIG. 1; 1 is a T-die, which extrudes molten polycarbonate resin into a sheet form; 2 is the sheet substrate extruded from the T-die; 3 is a three-piece roll which accurately controls the thickness of the melt extruded sheet substrate 4. To the sheet substrate which passes through the three-piece roll section are attached a release film (polyester film) 5 that is coated on the inside surface thereof with a covering material 6 for forming a scuff resistant hard coat layer and a release film 7 that is coated on the inside with a covering material for forming an antifogging organic hard coat layer while the pressure of the press rolls 9 being adjusted, thereby having the thickness of each uncured hard coat layer being controlled. The polycarbonate resin sheet coated with the uncured organic hard coat layers is then irradiated with UV light from a first photo-irradiation apparatus made up of 10 and 11 to give the polycarbonate resin sheet having a scuff resistant organic hard coat layer and an antifogging organic hard coat layer, respectively, being adhered to either side of the polycarbonate resin sheet, and thereafter this is followed by passing the sheet through press rollers 12 and peeling off the release films 13 and 14 from both surfaces of said polycarbonate resin sheet, to provide a resin sheet molded article of this invention.

In FIG. 1, the sheet is passed through a second photo-irradiation section 15 and 16 to further complete the curing of these organic hard coat layers and then is cut into the desired length to give a polycarbonate resin sheet of this invention.

17 and 18 in FIG. 1 are resin reservoirs for the uncured covering materials; having these resin reservoirs permits efficient control of the film thickness of the coated film by press rolls 9.

In the first photo-irradiation of the polycarbonate resin sheet, treating the resin sheet for a fixed duration of time under a condition of heating it to 30–70° C. will cause the polycarbonate resin sheet to swell in the region from the surface ranging from 0.3 to 5 μm by the uncured resin, whereby photocuring the uncured organic hard coat layer under these conditions can provide a polycarbonate resin sheet with an organic hard coat layer having extremely outstanding adhesion characteristics and excellent thermoformabilty.

The polycarbonate resin sheet can be heated by using an infrared heater or the heat generated from the UV lamp at the first photoirradiation section.

The prepared polycarbonate resin in the above manner may be made into a molded article with the antifogging organic hard coat layer on the inside and having a radius of curvature of 50—50 mm in the following manner:

The polycarbonate resin sheet is punched into a desired shape, for example, the shape of a motorcycle helmet shield. This shape is heated in a heating oven to 15–200° C., preferably to 60–170° C., then the heated shape is placed in a shape forming mold to give a curved shaped article with the antifogging organic hard coat layer on the inside and having a radius of curvature of 50–150 mm, and after cooling, it is removed from the shaping mold.

The polycarbonate resin sheet of this invention does not cause the organic hard coat layer to be peeled apart from the polycarbonate sheet substrate when being punched out and does not generate optical distortions when subjected to a bending fabrication and has extremely outstanding properties as a motorcycle helmet shield.

In the case of an automotive headlight lens and the like, the substrate can be molded by a suitable method, such as injection molding, followed by covering the surface by a covering material by spraying, coating, or other suitable method, which is further followed by curing.

As described above, the resin molded articles of this invention have significant features in that they exhibit excellent scuff resistance and antifogging properties and can be bend-processed to a radius of curvature of 50 mm or less, and should also be useful, in addition to the above applications, in vehicle window materials and refrigeration showcase window materials.

EXAMPLES

The present invention is further specifically described by the following examples. "Parts" in the examples indicate parts by weight and the test items for the resin molded articles were carried out by the following methods:

Antifogging Performance

This test was carried out by blowing breath at a distance of 20–30 cm from one side of a test piece conditioned by standing for 24 hours in an environment at 23° C. and 50% RH under the same conditions and examining the way the antifogging hard coated surface became foggy. The results were rated by the standards given below.

Incidentally, this evaluation was carried out before and after the test piece with the antifogging organic hard coat layer being on the inside was heated under a condition of 165° C.×5 minutes and pushed into a wooden mold having a radius of curvature of 100 mm for curvature-shaping.

○: No fogging even with repeated blowing of breath.

Δ: No fogging with repeated blowing of breath, but a reduction in the clarity of the test piece.

X: Fogging on repeated blowing of breath.

Adhesion of the Organic Hard Coat layer 100 grids with each grid being 1 mm×1 mm were generated on the hard coated surface of the test piece; an adhesive tape (a product of Nichiban K.K., Cellotape) was attached to the surface with the grids; and the adhesive tape was peeled off in one jerk with this action being repeated three times; and the number of remaining grids on the organic hard coat layer of the test piece was obtained as n/100.

Scuff Resistance of Antifogging Organic Hard Coat layer

The test piece was left standing for five minutes in a saturated water vapor environment at 40° C. and then the antifogging hard coated surface of the test piece was scratched with the tip of a nail. The scuff mark generated was evaluated using the following standard.

○: Not scuffed at all.

X: peeling of the scuffed hard coat film.

Moldability 100 mm×100 mm test piece was heated for 10 minutes in a hot air oven at 160° C. The heated sample was forced and bent into a mold with a radius of curvature of 15 mm with the antifogging hard coated surface to be inside; then the conditions of the hard coated surface were evaluated using the following standard:

C: No cracking

X: Cracking observed

Haze Value and Steel Wool Test

A #000 steel wool was mounted on a circular pad with a 25 mm diameter. The sample was placed on the table of a reciprocating abrasion tester with the scuff resistant hard coated surface facing upwards. The above circular pad surface was brought into contact with the hard coated surface and the test piece was rotated in a reciprocating fashion 100 times under a load of 200 g/cm$^2$ to carry out the abrasion resistance test of the sample. The test sample after the abrasion test was completed was washed and dried. The haze value of the abraded section of the test piece was measured by a haze meter to be reported as haze; the abrasion resistance by the steel wool test of the test piece was expressed by the following equation in terms of haze value (%).

Haze Value (%)=(% Haze of the Sample After the Steel Wool Test)

(% Haze of the Test Piece Before the Steel Wool Test)

Examples 1–7

The following crosslink-polymerizable compounds (a-1), (a-2) and (a-3) were made available.

(a-1):

A-200: A polyethylene glycol diacrylate having an average molecular weight of 200 (manufactured by Shin Nakamura Kagaku, tradename, NK Ester A-200).

A-400: A polyethylene glycol diacrylate having an average molecular weight of 400 (manufactured by Shin Nakamura Kagaku, tradename, NK Ester A-400).

A-600: A polyethylene glycol diacrylate having an average molecular weight of 600 (manufactured by Shin Nakamur a Kagaku, tradename, NK Ester A-600).

(a-2):

C6DA: 1,6-hexane diol diacrylate (manufactured by Osaka Yuki Kagaku Kogyo K.K., [Osaka Organic Chemical Industry Co., Ltd.]).

(a-3):

BPE-10: A diacrylate of an ethylene oxide-10-moles modified Bisphenol A (manufactured by Daichi Kogyo Seiyaku, tradename, New Frontier BPE-10).

BPE-4: A diacrylate of an ethylene oxide-4-moles modified Bisphenol A (manufactured by Shin Nakumura Kagaku, NK Ester A-PPE-4).

TAS: A condensation product of trimethylolpropane/succinic acid/acrylic acid=2/1/4 (molar ratio).

Nonionic Surfactant

E-905: Nonionic surfactant with HLB value of 9.2 (manufactured by Kao K.K., Emarugen [Phonetic translation] 905).

A-212E: Nonionic surfactant with HLB value of 10.3 (manufactured by Dai-ichi Kogyo Seiyaku, Plysurf [Phonetic translation] A-212E).

E-920: Nonionic surfactant with HLB value of 15.5 (manufactured by Kao K.K., Emarugen 920).

E-931: Nonionic surfactant with HLB value of 17.2 (manufactured by Kao K.K., Emarugen 931).

Anionic Surfactant

E-529: An ionic surfactant (Manufactured by Toho Kagaku Kogyo K.K., Phosphanol [Phonetic translation] LO-529).

Hydrophilic Copolymer (C)

A flask equipped with a stirrer was charged with 88 parts of dimethylaminopropyl methacrylamide and 228 parts of methanol, followed by adding dropwise with agitation a mixture of 138 parts of dimethyl sulfate and 41.3 parts of methanol, with the internal temperature of the flask kept at not higher than 15° C. It was further stirred for thirty minutes after the end of the dropwise addition. This generated a solution of a quaternary dimethylaminopropyl methacrylamide.

To this solution were added 3.7 parts of azobisisobutyronitrile, 2.4 parts of n-octyl mercaptan, 384 parts of methanol, 485 parts of a polyethylene glycol monomethacrylate with the unit number being 23, which was followed by polymerizing for six hours under a nitrogen atmosphere at 60° C. The resultant polymer solution was vacuum dried at 50° C. for 3 hours to provide a solid hydrophilic copolymer (C).

Photopolymerization Initiator (E)

APO: 2,4,6-trimethyl benzoyl diphenylphosphine oxide (manufactured by BASF Company, Lucirin TPO).

Covering Material for Forming Scuff Resistant Organic Hard Coat layer

A composition obtained by mixing 20 parts of a crosslinkable compound (hereafter TAS) obtained by condensing trimethylolethane/succinic acid/acrylic acid=2/1/4(molar ratio), 20 parts of urethanized pentaacrylate (manufactured by Shin Nakumura Kagaku K.K., an NK Ester U-6HA: hereafter U-6HA), 60 parts of 1,6-hexane diol diacrylate (manufactured by Osaka Yuki Kagaku Kogyo) was mixed with 3 parts by weight of APO as a photopolymerization initiator along with 1 part by weight of benzophenone.

Examples 1–7 and Comparative Examples 1–6

As shown in FIG. 1, polycarbonate was melt extruded from a T-die into a sheet form and passed through a three-piece press roll to form a 2 mm thick polycarbonate sheet. A 50 μm thick polyester release film with its inside surface being coated with the above covering material for forming the scuff resistant hard coat layer was brought into contact with the top surface of the polycarbonate sheet with the coated surface coming into contact with the polycarbonate sheet surface; at the same time, a 50 μm thick film polyester release film with the film surface being coated with a covering material for forming an antifogging organic hard coat layer, as given in Tables 1 and 2, was brought into contact with the bottom surface of the polycarbonate sheet with the coated surface coming into contact with the polycarbonate surface, so as to be integrated together by the press rolls, which was followed by heating the resultant polycarbonate sheet to 45° C. The thicknesses of the coatings were 8 μm for the scuff resistant organic hard coat layer and 12 μm for the antifogging organic hard coat layer.

With the uncured coated films receiving contact times of 50 seconds with the polycarbonate sheets, it was passed at a line speed of 1.6 m/min through a train having on the top and bottom sides thereof installed metal halide lamps (ozoneless types) with an output of 120 W/cm. This was followed by peeling off the release films to obtain a polycarbonate sheet of this invention having a scuff resistant organic hard coat layer and an antifogging organic hard coat layer thereon.

TABLE 1

| | | | | Examples | | | | | | |
|---|---|---|---|---|---|---|---|---|---|---|
| | | | | 1 | 2 | 3 | 4 | 5 | 6 | 7 |
| Covering Material for Forming Antifogging Organic Hard Coat Layer | Crosslink Polymerizable Monomer Mixture (A) | (a-1) | A-200 | 15 | 15 | 15 | 10 | 15 | 15 | 15 |
| | | | A-400 | 20 | 20 | — | 10 | 20 | 20 | 15 |
| | | | A-600 | — | — | 10 | — | — | — | — |
| | | (a-2) | C6DA | 5 | 5 | 5 | 5 | 20 | 5 | 15 |
| | | (a-3) | BPE-10 | 60 | 60 | 50 | 50 | 60 | 60 | 55 |
| | | | BPE-4 | | | 20 | | | | |
| | | | TAS | 0 | 0 | 10 | 10 | 10 | 15 | 10 |
| | Nonionic Surfactant (B) | | E-905 | 5 | 5 | 5 | 5 | 3 | 1.5 | 1.2 |
| | | | A-212E | — | — | — | — | 2 | 1.5 | 1.8 |
| | Hydrophilic Copolymer (C) | | | — | 5 | 3 | 10 | 3 | 3 | 5 |
| | Polymerization Initiator (E) | | APO | 1.5 | 1.5 | 1.5 | 1.5 | 1.5 | 1.5 | 1.5 |
| Performance of the Antifogging Organic Hard Coat Layer | Antifogging Performance | | Before Thermoforming | ○ | ○ | ○ | ○ | ○ | ○ | ○ |
| | | | After Thermoforming | Δ | ○ | ○ | ○ | ○ | ○ | ○ |
| | Adhesion (n/100) | | Before Thermoforming | 100/100 | 100/100 | 100/100 | 100/100 | 100/100 | 100/100 | 100/100 |
| | | | After Thermoforming | 100/100 | 100/100 | 100/100 | 100/100 | 100/100 | 100/100 | 100/100 |
| | Scuff Resistance | | | ○ | ○ | ○ | ○ | ○ | ○ | ○ |
| Physical Properties of the Scuff Resistant Organic Hard Coat Layer | Polycarbonate Sheet Punchability | | | ○ | ○ | ○ | ○ | ○ | ○ | ○ |
| | Thickness of Swelling of the Polycarbonate Sheet by Impregnation With Hard Coat Covering Material (μm) | | | 2 | 2 | 2 | 2 | 2 | 2 | 2 |
| | Haze Value (%) | | | 0.1 | 1.1 | 0.8 | 0.9 | 1.0 | 0.8 | 1.1 |
| | Adhesion of the Hard Coat Layer (n/100) | | | 100/100 | 100/100 | 100/100 | 100/100 | 100/100 | 100/100 | 100/100 |
| | Curvature Shapeability (Radius of Curvature mm) | | | 40 | 40 | 40 | 40 | 40 | 40 | 40 |

TABLE 2

| | | | | Comparative Examples | | | | | |
|---|---|---|---|---|---|---|---|---|---|
| | | | | 1 | 2 | 3 | 4 | 5 | 6 |
| Covering Material for Forming Antifogging Organic Hard Coat Layer | Crosslink Polymerizable Monomer Mixture (A) | (a-1) | A-200 | 20 | 20 | 15 | 15 | 15 | 15 |
| | | | A-400 | — | 20 | 20 | 20 | 20 | 20 |
| | | (a-2) | C6DA | — | — | 5 | 5 | 5 | 5 |
| | | (a-3) | BPE-10 | 80 | 60 | 60 | 60 | 60 | 60 |
| | Nonionic Surfactant (B) | | E-905 | 5 | 5 | — | — | — | — |
| | | | E-920 | — | — | — | 5 | — | — |
| | | | E-931 | — | — | — | — | 5 | — |
| | | | A-212E | — | — | — | — | — | 5 |
| | Hydrophilic Copolymer (C) | | | — | — | — | 3 | 3 | 3 |
| | Polymerization Initiator (E) | | APO | 1.5 | 1.5 | 1.5 | 1.5 | 1.5 | 1.5 |

TABLE 2-continued

|  |  |  | Comparative Examples | | | | | |
|---|---|---|---|---|---|---|---|---|
|  |  |  | 1 | 2 | 3 | 4 | 5 | 6 |
| Performance of the Antifogging Organic Hard Coat Layer | Antifogging Performance | Before Thermoforming | ○ | ○ | × | ○ | ○ | ○ |
|  |  | After Thermoforming | Δ | Δ | × | × | × | ○ |
|  | Adhesion (n/100) | Before Thermoforming | 100/100 | 100/100 | 100/100 | 100/100 | 100/100 | 100/100 |
|  |  | After Thermoforming | 0/100 | 0/100 | 100/100 | 0/100 | 0/100 | 0/100 |
|  | Scuff Resistance |  | ○ | ○ | ○ | ○ | ○ | ○ |

Examples 8–14 and Comparative Examples 7–13

Polycarbonate sheets that were provided with scuff resistance and antifogging properties were prepared using the covering materials for forming antifogging organic hard coat layers shown in Tables 3 and 4 and using the covering material for forming the scuff resistant organic hard coat layers used in Example 1, in a manner similar to that of Example 1, and their performance was tested with the results being shown in Tables 3 and 4.

TABLE 3

|  |  |  |  |  | Examples | | | | | | |
|---|---|---|---|---|---|---|---|---|---|---|---|
|  |  |  |  |  | 8 | 9 | 10 | 11 | 12 | 13 | 14 |
| Covering Material for Forming Antifogging Organic Hard Coat Layer | Crosslink Polymerizable Monomer Mixture (A) | (a-1) | | A-200 | 15 | 15 | 15 | 15 | 20 | 35 | 20 |
| | | | | A-400 | 20 | 20 | 20 | 15 | 30 | 20 | 30 |
| | | (a-2) | | C6DA | 5 | 5 | 5 | 5 | 20 | 5 | 15 |
| | | | | TAS | — | — | — | 10 | 10 | 15 | 10 |
| | | | | U-108A | 0 | 0 | 0 | 10 | 0 | 10 | 5 |
| | | (a-3) | | BPE-10 | 60 | 60 | 60 | 45 | 20 | 15 | 20 |
| | Nonionic Surfactant (B) | | | E-905 | 1.2 | 1.2 | 3.0 | 3.0 | 3.0 | 3.0 | 1.8 |
| | Anioni Surfactant (B) | | | E-529 | 1.8 | 1.8 | 1.8 | 1.8 | 1.8 | 1.8 | 1.2 |
| | Hydrophilic Copolymer (C) | | | | 5 | 10 | 10 | 10 | 10 | 10 | 15 |
| | Polymerization Initiator (E) | | | APO | 1.5 | 1.5 | 1.5 | 1.5 | 1.5 | 1.5 | 1.5 |
| Performance of the Antifogging Organic Hard Coat Layer | Antifogging Performance | Before Thermoforming | | | ○ | ○ | ○ | ○ | ○ | ○ | ○ |
| | | After Thermoforming | | | ○ | ○ | ○ | ○ | ○ | ○ | ○ |
| | Adhesion (n/100) | Before Thermoforming | | | 100/100 | 100/100 | 100/100 | 100/100 | 100/100 | 100/100 | 100/100 |
| | | After Thermoforming | | | 100/100 | 100/100 | 100/100 | 100/100 | 100/100 | 100/100 | 100/100 |
| | Scuff Resistance | | | | ○ | ○ | ○ | ○ | ○ | ○ | ○ |
| Physical Properties of the Scuff Resistant Organic Hard Coat Layer | Polycarbonate Sheet Punchability | | | | ○ | ○ | ○ | ○ | ○ | ○ | ○ |
| | Thickness of Swelling of the Polycarbonate Sheet by Impregnation With Hard Coat Covering Material (μm) | | | | 2 | 2 | 2 | 2 | 2 | 2 | 2 |
| | Haze Value (%) | | | | 0.8 | 1.0 | 0.9 | 0.7 | 0.7 | 0.9 | 1.0 |
| | Adhesion of the Hard Coat Layer (n/100) | | | | 100/100 | 100/100 | 100/100 | 100/100 | 100/100 | 100/100 | 100/100 |
| | Curvature Shapeability (Radius of Curvature mm) | | | | 40 | 40 | 40 | 40 | 40 | 40 | 40 |

TABLE 4

|  |  |  |  |  | Comparative Examples | | | | | | |
|---|---|---|---|---|---|---|---|---|---|---|---|
|  |  |  |  |  | 7 | 8 | 9 | 10 | 11 | 12 | 13 |
| Covering Material for Forming Antifogging Organic Hard Coat Layer | Crosslink Polymerizable Monomer Mixture (A) | (a-1) | | A-200 | 15 | 15 | 15 | 15 | 10 | 15 | 60 |
| | | | | A-400 | 20 | 20 | 20 | 20 | 20 | 20 | 40 |
| | | (a-2) | | C6DA | 5 | 5 | 5 | 5 | 50 | 5 | — |
| | | (a-3) | | BPE-10 | 60 | 60 | 60 | 60 | 20 | 60 | — |
| | Nonionic Surfactant (B) | | | E-905 | 1.2 | 1.2 | — | 3 | 1.2 | 1.2 | 1.2 |
| | Anioni Surfactant (B) | | | E-529 | 1.8 | 6.0 | — | — | 1.8 | 1.8 | 1.5 |
| | Hydrophilic Copolymer (C) | | | | — | 5 | 10 | — | 5 | 25 | — |
| | Polymerization Initiator (E) | | | APO | 1.5 | 1.5 | 1.5 | 1.5 | 1.5 | 1.5 | 1.5 |
| Performance of the Antifogging Organic Hard Coat Layer | Antifogging Performance | Before Thermoforming | | | ○ | ○ | Δ | ○ | × | ○ | × |
| | | After Thermoforming | | | ○ | ○ | × | × | × | ○ | × |
| | Adhesion (n/100) | Before Thermoforming | | | 100/100 | 100/100 | 100/100 | 100/100 | 100/100 | 100/100 | 100/100 |
| | | After Thermoforming | | | 100/100 | 100/100 | 100/100 | 100/100 | 100/100 | 100/100 | 100/100 |
| | Scuff Resistance | | | | ○ | ○ | ○ | ○ | ○ | ○ | × |
| | Appearance of Coating on Molded Articles | | | | × | × | ○ | ○ | ○ | ブリード | × |

Examples 15–17 and Comparative Example 14
Covering Material for Forming Antifogging Organic Hard Coat Layer (XV)

There were sequentially added to a flask 195 parts by weight of isopropanol, 180 parts by weight of a polyethylene glycol diacrylate having a molecular weight of 200 (manufactured by Shin Nakamura Kagaku, NK Ester A-200), 39 parts by weight of γ-mercaptopropyl trimethoxysilane (manufactured by Shinetsu Silicone K.K., KBM-803), and 25 parts by weight of an isopropanol solution having 3% by weight of triphenyl phosphine; the resultant solution was stirred to allow reaction to take place at room temperature for three days.

It was confirmed that the reaction gave a solution containing a polymerizable silane coupling agent resulting from the Michael addition reaction of γ-mercaptopropyl trimethoxysilane and the polyethylene glycol diacrylate.

A mixed solution of the 160 parts of the resultant reaction solution and 4 parts by weight of the same type of polyethylene glycol diacrylate used as above was vigorously stirred and to this was added 234 parts by weight of an isopropanol solution of colloidal silica (manufactured by Nissan Kagaku Kogyo, IPA-ST: 30% by weight of solids); then, 6 parts by weight of 0.01 N aqueous hydrochloric acid solution was added followed by stirring for one hour at 40° C. to chemically modify the colloidal silica with the silane coupling agent.

To this reaction solution was added 47 parts by weight of a polyethylene glycol diacrylate (manufactured by Shin Nakumura Kagaku, NK Ester A-400) having a molecular weight of 400; the mixture was treated by a rotary evaporator to distill off the volatile components from the mixture at a reduced pressure.

A composition for forming an antifogging organic hard coat layer [XV] was prepared by dissolving, in 100 parts by weight of the resultant reaction solution, 3 parts by weight of a nonionic surfactant having an HLB of 9.2 (manufactured by Kao K.K., Emarugen 905), 1.8 parts by weight of anionic surfactant (manufactured by Toho Kagaku Kogyo, Phosphanol LO-529) of the general formula (4), and 1.5 parts by weight of an acyl phosphine oxide as a photopolymerization initiator.

Covering Material for Forming an Antifogging Organic Hard Coat Layer (XVI)

To a flask were added 207 parts by weight of isopropanol, 167 parts by weight of a polyethylene glycol diacrylate having a molecular weight of 200 (manufactured by Shin Nakamura Kagaku, NK Ester A-200), and 40 parts by weight of γ-aminopropyl trimethoxysilane (manufacturing by Shinetsu Silicone K.K., KBM-903), followed by stirring for 3 days at room temperature to carry out the Michael addition reaction; this generated a silane compound having acryolyoxy group and polyethylene glycol units.

82 parts by weight of the above resultant reaction solution was mixed with 57 parts by weight of the same type of polyethylene glycol diacrylate as that used above, and to this mixture, while being vigorously stirred, were added 134 parts by weight of an isopropanol solution of colloidal silica (manufactured by Nissan Kagaku, IPA-ST: 30% by weight of solids) and 1 part by weight of water for reaction to take place for one hour at 40° C. producing a solution of fine silica particles which were chemically modified with a polymerizable silane coupling agent.

The above solution was mixed with 61 parts by weight of a polyethylene glycol diacrylate having a molecular weight of 400 (manufactured by Shin Nakamura Kagaku, NK Ester A-400) and was treated by a rotary evaporator to distill off the volatile components at reduced pressure.

A composition for forming an antifogging organic hard coat layer (XVI) was prepared by dissolving, in 100 parts by weight of the resultant reaction solution, 3 parts by weight of a nonionic surfactant having an HLB of 9.2 (manufactured by Kao K.K., Emarugen 905), 1.8 parts by weight of an anionic surfactant (manufactured by Toho Kogaku Kogyo, Phosphanol LO-529) of the general formula (4), and 1.5 parts by weight of an acyl phosphine oxide photopolymerization initiator.

Covering Material for Forming Antifogging Organic Hard Coat Layer (XVII)

A covering material for forming an antifogging organic hard coat layer (XVII) shown in Table 5 was prepared by the same method as that used in the manufacture of the covering material for forming an antifogging organic hard coat layer (XVI).

Polycarbonate sheets having a scuff resistant organic hard coat layer and an antifogging organic hard coat layer were prepared by the same manner, except for using as the covering material for forming the antifogging organic hard coat layer the above resultant covering materials for forming antifogging organic hard coat layers, XV, XVI and XVII.

Table 5 shows the results of testing the characteristics of these polycarbonate sheets.

TABLE 5

|  |  |  |  | Examples | | | Comparative Examples |
|---|---|---|---|---|---|---|---|
|  |  |  |  | 15 | 16 | 17 | 14 |
| Covering Material for Forming Antifogging Organic Hard Coat Layer | Crosslink (a - 1) Polymerizable Monomer Mixture (A) | | A - 200 | 50 | 56 | 50 | 50 |
| | | | A - 400 | 50 | 44 | 50 | 50 |
| | Nonionic Surfactant (B) | | E - 905 | 3 | 3 | 3 | 3 |
| | Anionic Surfactant (B) | | E - 529 | 1.8 | 1.8 | 1.8 | 1.8 |
| | Fine Metal Oxide Particles (D) | | | 110 | 45 | 60 | — |
| | Polymerization Initiator (E) | | APO | 1.5 | 1.5 | 1.5 | 1.5 |
| Performance of the Antifogging Organic Hard Coat Layer | Antifogging Performance | Before Thermoforming | | ○ | ○ | ○ | ○ |
| | | After Thermoforming | | ○ | ○ | ○ | X |
| | Adhesion (n/100) | Before Thermoforming | | 100/100 | 100/100 | 100/100 | 100/100 |
| | | After Thermoforming | | 100/100 | 100/100 | 100/100 | 100/100 |
| | Scuff Resistance | | | ○ | ○ | ○ | ○ |
| | Appearance of Coating on Molded Article | | | ○ | ○ | ○ | X |

TABLE 5-continued

|  |  | Examples | | | Comparative Examples |
|---|---|---|---|---|---|
|  |  | 15 | 16 | 17 | 14 |
| Physical Properties of the Scuff Resistant | Polycarbonate Sheet Punchability | ○ | ○ | ○ | ○ |
|  | Thickness of Swelling of the Polycarbonate Sheet by Impregnation With Hard Coat Covering Material (μm) | 2 | 2 | 2 | 2 |
| Organic Hard Coat Layer | Haze Value (%) | 0.7 | 0.7 | 0.8 | 0.7 |
|  | Adhesion of the Hard Coat Layer (n/100) | 100/100 | 100/100 | 100/100 | 100/100 |
|  | Curvature Shapeability (Radius of Curvature mm) | 40 | 40 | 40 | 40 |

What is claimed is:

1. A resin molded article comprising a substrate having on one side thereof a scuff resistant organic hard coat layer with a haze value of not more than 5% and having on the other side thereof an antifogging organic hard coat layer comprising a covering material, wherein the covering material is a composition comprising:
100 parts by weight of a crosslink-polymerizable mixture (A) comprising the following components (a-1) –(a-3) mixed therein to give a total of 100 parts by weight:
(a-1) 10–90 parts by weight of a polyethylene glycol di(meth)acrylate with a molecular weight of 150–2,000;
(a-2) 0–40 parts by weight of a di(meth)acrylate represented by the following general formula (1):

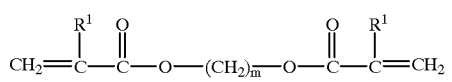

(1)

wherein $R^1$ represents H or $CH_3$; m represents an integer of 2–50;
(a-3) 0–90 parts by weight of at least another copolymerizable (meth)acrylate or poly(meth)acrylate;
to which mixture (A) are added:
0.1–15 parts by weight of a surfactant (B) selected from nonionic and anionic surfactants;
0.1–20 parts by weight of a hydrophilic copolymer (C) of 5–95 parts by weight of a monomer represented by the general formula (2):

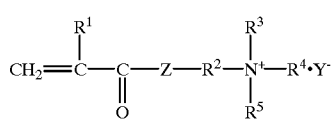

(2)

wherein $R^1$ represents hydrogen or $CH_3$; $R^2$, a $C_2$–$C_8$ alkylene group; $R^3$–$R^5$, a $C_1$–$C_{50}$ alkyl alkyl group; Z, O atom or NR6; R6 is H or an alkyl group; and Y, the anion of the quaternization agent;
and 95–5 parts by weight of a monomer represented by the general formula (3):

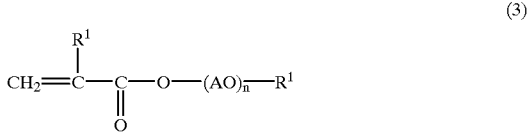

(3)

wherein $R^1$ is the same as above; A represents a $C_2$–$C_{10}$ alkylene group; and n, an integer of (1–100); or 10–150 parts by weight of metal oxide fine particles (D) which are chemically modified with a polymerizable silane coupling agent; and
0.01–10 parts by weight of a polymerization initiator.

2. A resin molded article as set forth in claim 1, wherein use is made of a covering material for forming an antifogging organic coat layer comprising 0.1–10 parts by weight of a nonionic surfactant with an HLB value of 6–11 as a surfactant(B).

3. A resin molded article as set forth in claim 1 wherein use is made of a covering material for forming an antifogging organic coat layer which uses as a surfactant(B) a combination of 0.1–10 parts by weight of a nonionic surfactant with an HLB value of 6–11 and 0.1–5 parts by weight of an anionic surfactant represented by General formula (5):

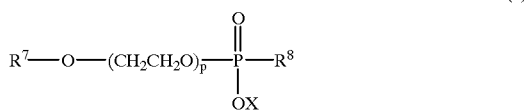

(5)

(where; $R^7$ represents an alkyl or phenyl group; $R^8$, —OX or —O—$(CH_2CH_2O—)_q$—$R^9$ (where; $R^9$ represents an alkyl or phenyl group; q, an integer of 1–50); X, an alkali or ammonium salt; p, an integer of 1–50).

4. A resin molded article as set forth in claim 1, wherein use is made, as a polymerizable silane coupling agent, of a Michael addition product of a polyalkylene glycol diacrylate having a molecular weight of 150–1,000, with a mercaptosilane or with an aminosilane.

5. A resin molded article as set forth in claim 1, wherein the scuff resistant organic hard coat layer having a haze value of not more than 5% is formed from the following covering material for forming a scuff resistant organic hard coat layer, the covering material for forming the scuff-resistant organic hard coat layer comprising;
10–90 parts by weight of a crosslink-polymerizable compound having at least two (meth)acryloxy groups in the molecule, or a mixture comprising not less than 50% by weight of said crosslink-polymerizable compound and not more than 50 parts by weight of a compound copolymerizable therewith, 0.01–10 parts by weight of a photopolymerization initiator, 0–30 parts by weight of a UV absorber, and 0–5 parts by weight of a hindered amine type stabilizer.

6. A resin molded article as set forth in claim 5, wherein the resin molded article is an organic resin sheet.

7. A resin molded article as set forth in claim 5, wherein the substrate is a polycarbonate resin sheet with the inside surface thereof having an antifogging organic hard coat layer formed on it, the resin molded article being molded into a molded article with a radius of curvature of not more than 50 mm.

8. A resin molded article as set forth in claim 7, wherein the external surface of the substrate has a scuff resistant organic hard coat layer comprising the following covering material for forming the scuff-resistant organic hard coat layer, the covering material for forming the scuff resistant organic hard coat layer being a photocurable resin composition comprising;

100 parts by weight of a monomer mixture comprising 20–80% by weight of a polyfunctional (meth)acrylate monomer (III) having at least two (meth)acryloyloxy groups and having a viscosity at 25° C. of 150 cp or higher and 20–80% by weight of a polyfunctional (meth)acrylate monomer (IV) having one to two (meth) acryloyloxy groups and having a viscosity at 25° C. of less than 150 cp, 0.1–10 parts by weight of a photopolymerization initiator, 0–6 PARTS by weight of a ultraviolet absorber, and 0–5 parts by weight of a hindered amine type light stabilizer.

9. A resin molded article as set forth in claim 8, wherein the polyfunctional (meth)acrylate monomer (III) is a mixture comprising:

1–99%-by weight of a polyfunctional (meth)acrylate (b-1) obtained by condensing a dibasic carboxylic acid/polyhydric alcohol/(meth)acrylic acid;

1–99% by weight of a polyfunctional (meth)acrylate (b-2) obtained by reacting an isocyanate represented by the general formula (8) with a (meth)acrylate having active oxygen; and

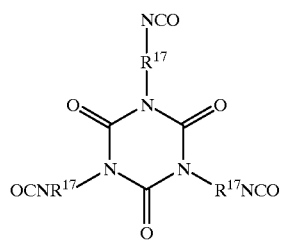

(8)

wherein $R^{17}$ represents an aliphatic alkylene group having 1–12 carbons;

0–20 parts by weight of (b-3) a urethane (meth)acrylate monomer represented by general formula (11):

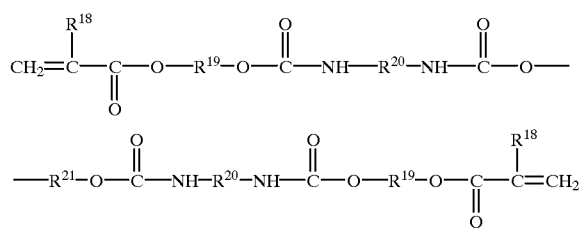

(11)

wherein $R^{18}$ represents hydrogen or a methyl group, $R^{19}$ is a hydrocarbon group having 1–8 carbons, $R^{20}$ is a phenylene group, substituted phenylene group, or an alkylene group having 2–12 carbons, $R^{21}$ is polycaprolactone diol or

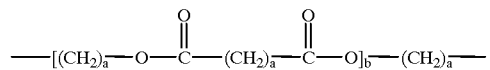

wherein a represents an integer of 1–8,b represents an integer of 0–10.

10. A helmet shield made of a polycarbonate resin, wherein the polycarbonate resin sheet of claim 7 being cut into the shape of a helmet shield, heated to 150–200° C., and shaped to form a curved surface with the antifogging organic hard coat layer being an inside surface and with a radius of curvature of 50–150 mm.

11. A resin molded article as set forth in claim 11, wherein the substrate is a polycarbonate sheet and the thickness of the polycarbonate sheet swollen by the covering material for forming the hard coat layers is 0.3–5 μm.

12. A resin molded article as set forth in claim 1, wherein the scuff resistant organic hard coat layer has a haze value of 3% or less.

13. A resin molded article as set forth in claim 1, wherein the scuff resistant organic hard coat layer has a haze value of 1.5% or less.

14. A continuous process to manufacture a polycarbonate resin sheet having a scuff resistant organic hard coat layer and an antifogging organic hard coat layer comprising:

forming a substrate of a polycarbonate resin sheet by a continuous extrusion process;

providing on one side of the substrate with an uncured coat comprising a covering material for forming a scuff resistant organic hard coat layer capable of forming a scuff resistant organic hard coat layer with a haze value of not more than 5%;

providing on the other side of the polycarbonate resin sheet with an uncured coat comprising a UV curable covering material for forming an antifogging organic hard coat layer as set forth in claim 1;

irradiating the uncured coats under conditions of having light transparent release films held in contact with these uncured coated surfaces, thereby curing these coats, and peeling off the release films.

15. A continuous process to manufacture a polycarbonate resin sheet as set forth in claim 14, wherein the polycarbonate resin sheet is 0.5–5 mm thick.

16. A continuous process to manufacture a polycarbonate resin sheet as set forth in claim 14, wherein the polycarbonate resin sheet is irradiated with light under conditions where it is heated to 30–70° C.

17. A covering material for forming an antifogging organic hard coat layer comprising;
    100 parts by weight of a crosslink-polymerizable mixture (A) comprising the following components (a-1)–(a-3) mixed together to give a total of 100 parts by weight:
    (a-1) 10–90 parts by weight of a polyethylene glycol di(meth)acrylate with a molecular weight of 150–2,000;
    (a-2) 0–40 parts by weight of a di(meth)acrylate represented by the following formula (1):

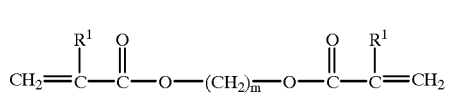
(1)

wherein $R^1$ represents H or $CH_3$; m represents an integer of 2–50;
(a-3) 0–90 parts by weight of at least another copolymerizable (meth)acrylate or poly(meth)acrylate; to which mixture (A) are added:
    0.1–15 parts by weight of a surfactant (B) selected from nonionic and anionic surfactants;
    0.1–20 parts by weight of a hydrophilic copolymer (C) of 5–95 parts by weight of a monomer represented by the general formula (2):

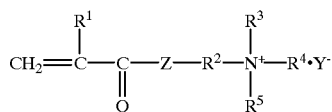
(2)

wherein $R^1$ represents hydrogen or $CH_3$; $R^2$, an alkylene group having 2–8 carbons; $R^3$–$R^5$, an alkyl group having 1–50 carbons; Z, O atom or NR6; R6 is H or an alkyl group; and Y is the anion of the quaternization agent;
and 95–5 parts by weight of a monomer represented by the general formula (3)

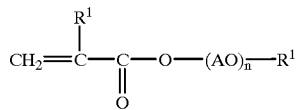
(3)

wherein $R^1$ is the same as the above; A represents a $C_2$–$C_{10}$ alkylene group; and
n, an integer of 1–100; or 10–150 parts by weight of metal oxide fine particles (D) which are chemically modified with a polymerizable vinyl-group-containing silane coupling agent; and
0.01–10 parts by weight of a polymerization initiator.

18. A covering material for forming an antifogging organic hard coat layer as set forth in claim 17, wherein use is made of a covering material for forming an antifogging organic coat layer comprising 0.1–10 parts by weight of a nonionic surfactant with an HLB value of 6–11 as a surfactant(B).

19. A covering material for forming an antifogging organic hard coat layer as set forth in claim 18 wherein use is made as a surfactant (B) of a combination of 0.1–10 parts by weight of a nonionic surfactant with an HLB value of 6–11 and 0.1–5 parts by weight of an anionic surfactant represented by general formula (5)

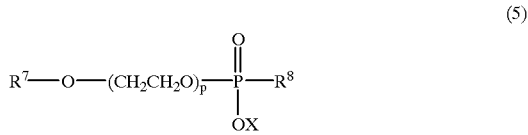
(5)

(where; $R^7$ represents an alkyl or phenyl group; $R^8$, —OX or —O—$(CH_2CH_2O—)_q$—$R^9$ (where; $R^9$ represents an alkyl or phenyl group; q, an integer of 1–50); X, an alkali metal or ammonium salt; p, an integer of 1–50).

20. A covering material for for an antifogging organic hard coat layer as set forth one of claim 17, wherein use is made, as a polymerizable silane coupling agent, of a Michael addition product of a polyalkylene glycol diacrylate with a molecular weight of 150–1,000 with a mercapto-group-containing silane or a primary or secondary amino-group-containing silane.

21. A resin molded article as set forth in claim 20, wherein use is made, as a polymerizable silane coupling agent, of a Michael addition product of a poly(meth)acrylate with a silane compound represented by the general formula (12) shown below or a compound represented by the general formula (13):

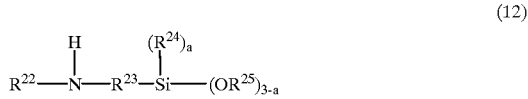
(12)

(where; $R^{22}$ represents a hydrogen atom or an alkyl group having 1–10 carbons, $R^{23}$ a linear or substituted an alkylene group having 1–10 carbons, $R^{24}$ and $R^{25}$, hydrogen atoms or alkylene groups having 1–10 carbons; a, an integer of 0–2);

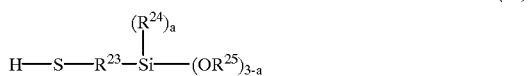
(13)

(where; $R^{23}$ represents a linear or substituted alkylene group having 1–10 carbons; $R^{24}$ and $R^{25}$, hydrogen atoms or alkylene groups having 1–10 carbons; a, an integer of 0–2).

* * * * *